S. JENNINGS.
Thill Shifter.
No. 88,042.
Patented March 23, 1869.
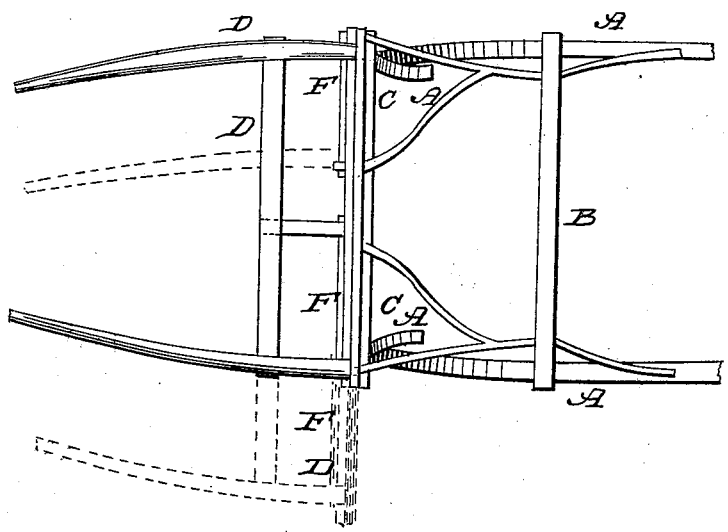
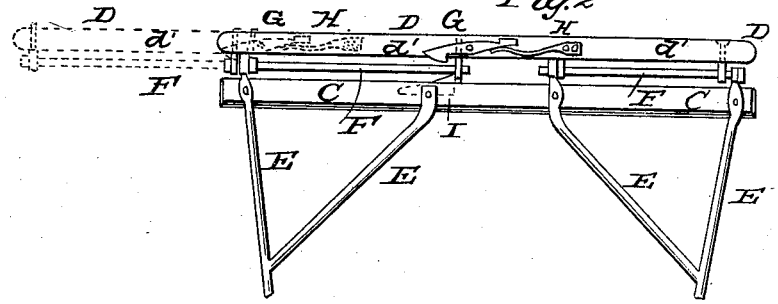

UNITED STATES PATENT OFFICE.

S. JENNINGS, OF PATTERSON, NEW YORK.

IMPROVED THILL-SHIFTER.

Specification forming part of Letters Patent No. 88,042, dated March 23, 1869.

*To all whom it may concern:*

Be it known that I, S. JENNINGS, of Patterson, in the county of Putnam and State of New York, have invented a new and Improved Thill-Shifter; and I do hereby declare that the following is a full, clear, and exact description thereof, which will enable others skilled in the art to make and use the same, reference being had to the accompanying drawings, forming part of this specification, in which—

Figure 1 is a top view of the forward part of a cutter or single-horse sleigh to which my improvement has been attached. Fig. 2 represents the thills as turned down to show the construction and arrangement of the parts.

Similar letters of reference indicate corresponding parts.

My invention has for its object to furnish an improved means of connecting the thills to the sleigh, which shall be strong, durable, and simple in construction, and at the same time so constructed that the thills may be shifted from a side to a central draft, or the contrary, with one hand, while the horse is attached, or even while he is in motion; and it consists in the construction, combination, and arrangement of the various parts, as hereinafter more fully described.

A are the runners. B is the forward beam. C is the cross-bar, and D are the thills. E are the draft-irons, the rear ends of which are attached to the forward beam, B.

The forward parts of the outer arms of the irons E are attached to the forward parts of the runners A, and have eyes formed in their forward ends to receive the rods or bolts F, by means of which the thills D are connected with the sleigh.

The forward parts of the inner arms of the irons E are attached to the cross-bar C, and upon the forward end of the right-hand one is formed an eye for the reception of one of the connecting bolts or rods F, as shown in Fig. 2.

To the cross-bar $d'$ of the thill D are attached three eyes, in such positions that when the thills D are attached to the sleigh the cross-bar $d'$ of the thills will be directly over the cross-bar C of the sleigh, so as to preserve the parts from the liability to become clogged up with snow and ice. These eyes are so arranged that the movement of the thills through the distance of the said eyes apart will change the draft from the side to the center, or the contrary.

The bolts or rods F, two of which are used, are passed through the eyes, the right-hand rod passing through the two eyes of the right-hand draft-iron and through one of the thill-eyes, and the left-hand bolt or rod passing through the single eye of the left-hand draft-iron and through two of the thill-eyes, in each case the single eye of the one set being placed between the two eyes of the other set, as shown in Fig. 2.

By this construction and arrangement of the bolts and eyes the thills can be easily shifted from the side to the central draft, and the contrary, the thills carrying the left-hand bolt or rod F with them, while the right-hand bolt or rod remains stationary, so that, should the horse start suddenly, or any other accident happen, it will be impossible for the connection to be caught in an insecure position.

The rods or bolts F are made with heads upon their outer ends, and they are secured in place by small leather or rawhide keys passed through holes in their inner ends. This construction I prefer, as being less liable to work loose than metal keys or nuts, and thus being more secure.

When shifted to the side draft, the thills are secured in place by the catch G, attached to the cross-bar $d'$, and which takes hold of the eye of the left-hand draft-iron E.

The catch G is held down to its place by the spring H, attached to the cross-bar $d'$, and the free end of which rests against the rear end of the catch G, as shown in Fig. 2.

The thills, when shifted to the central draft, are secured in place by the catch I, attached to the cross-bar C, and the inclined upper edge of which projects above the said bar C, so as to allow the central thill-eye to pass it easily while moving to the right but which will prevent the return of said thills until the bars C and $d'$ have been sprung apart, which can be easily done with the same hand that holds the thills ready to shift them to the side draft.

Having thus described my invention, I claim as new and desire to secure by Letters Patent—

The combination and arrangement of the draft-irons E, two bolts, F, catch G, spring H, stationary catch I, and connecting-eyes with each other, with the cross-bars $d'$ and C, and forward beam or knees of the sleigh, substantially as herein shown and described, and for the purpose set forth.

S. JENNINGS.

Witnesses:
    JOHN J. TYSON,
    DAVID BAKER.